INVENTOR
Bo N. Hoffstrom

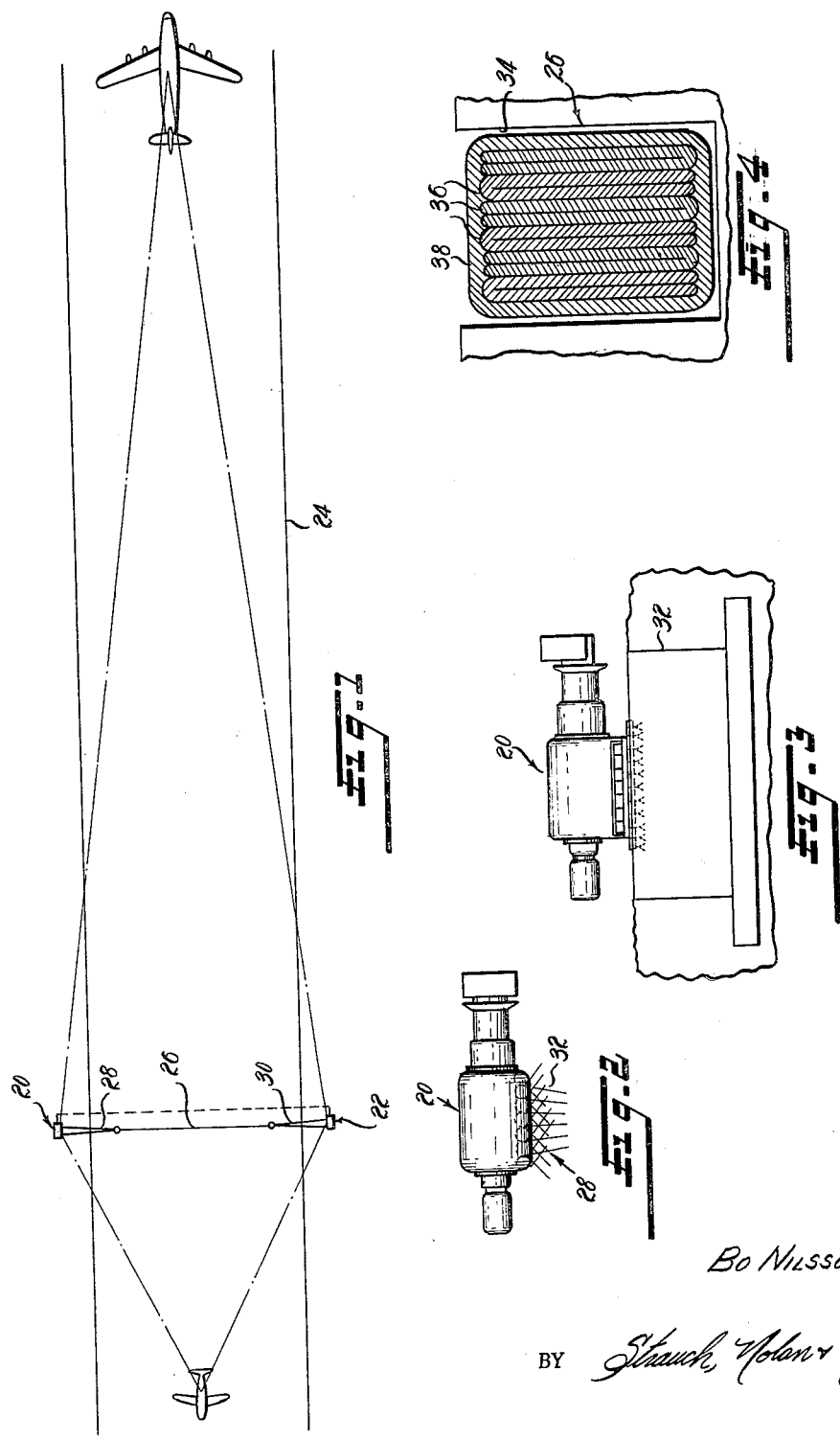

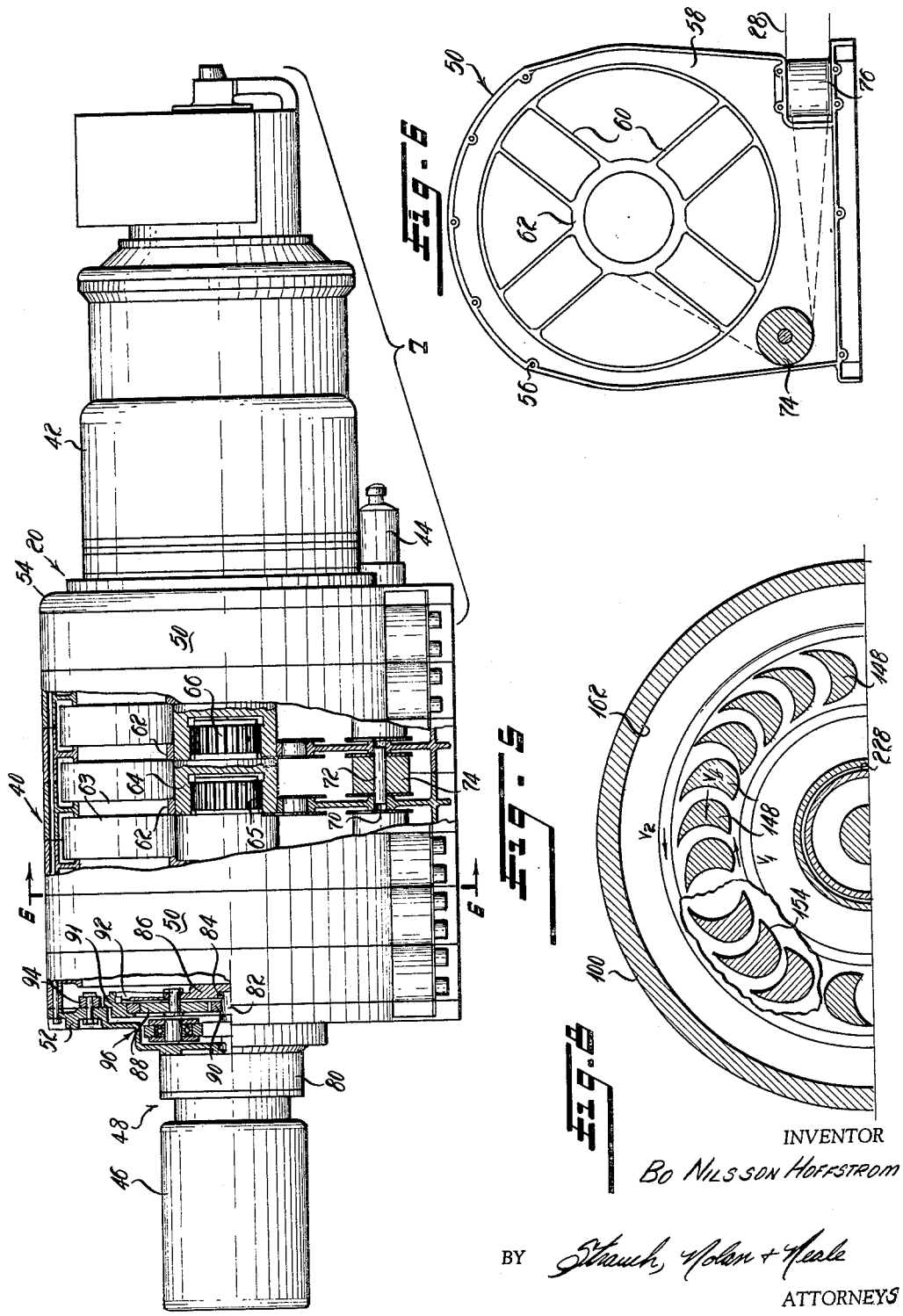

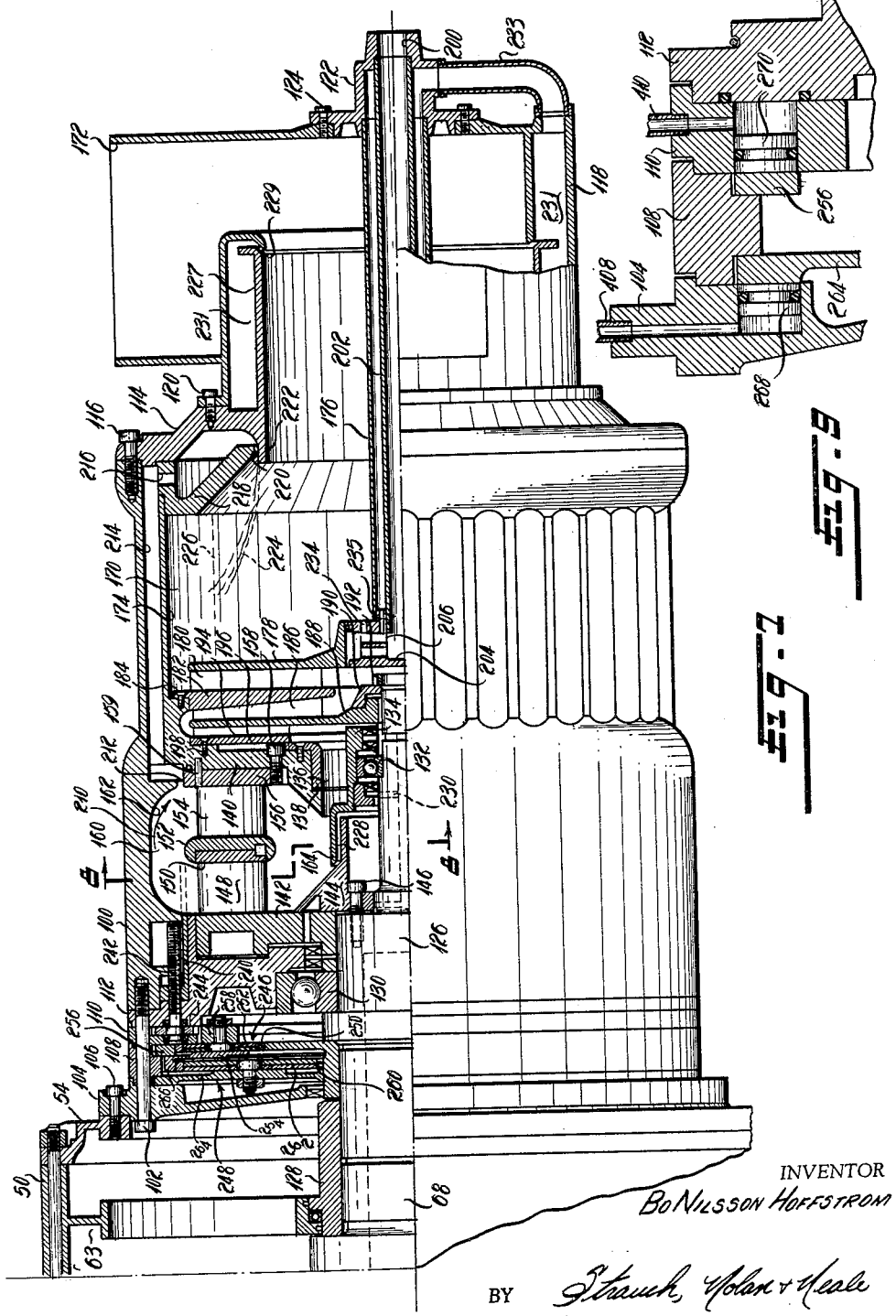

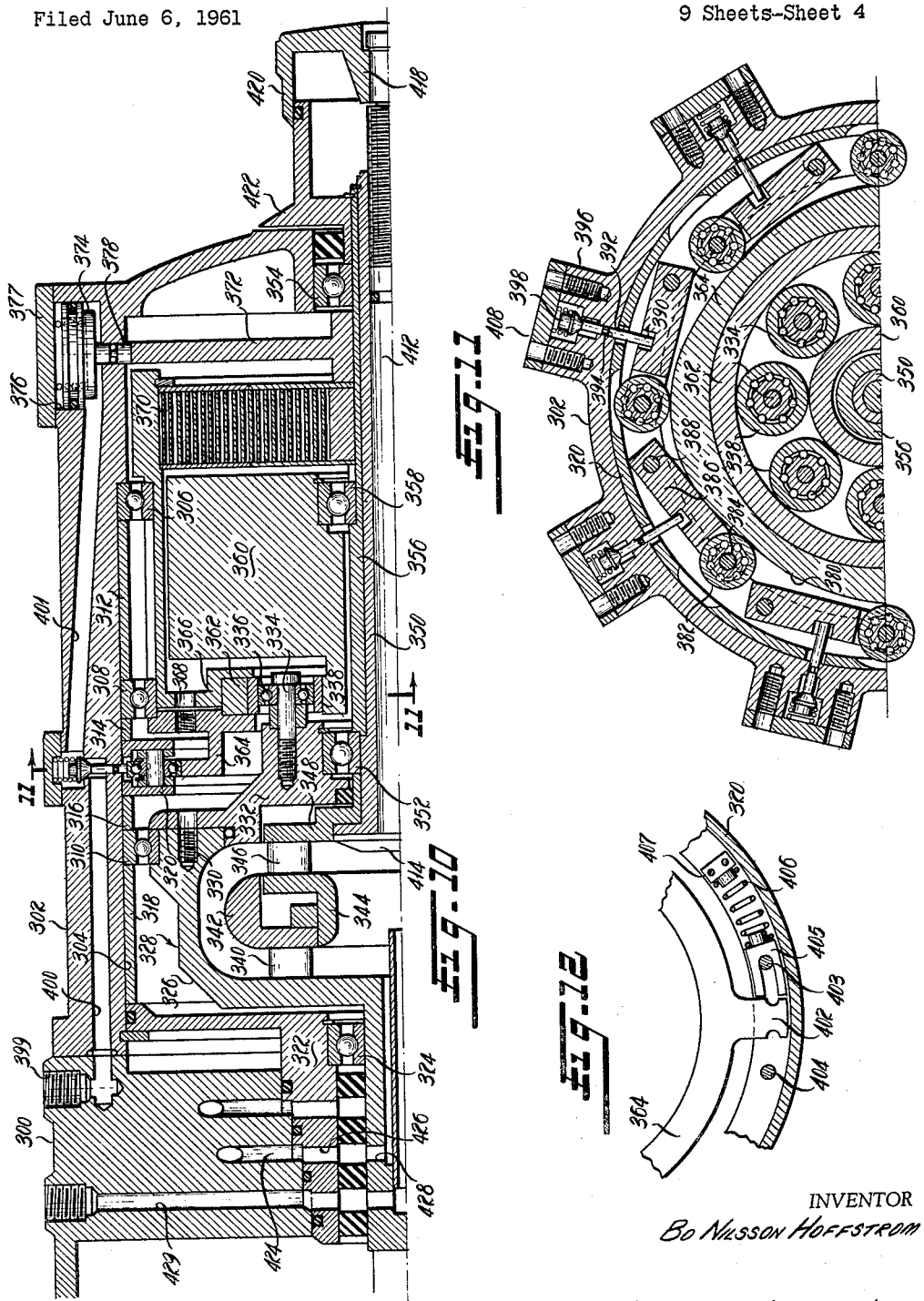

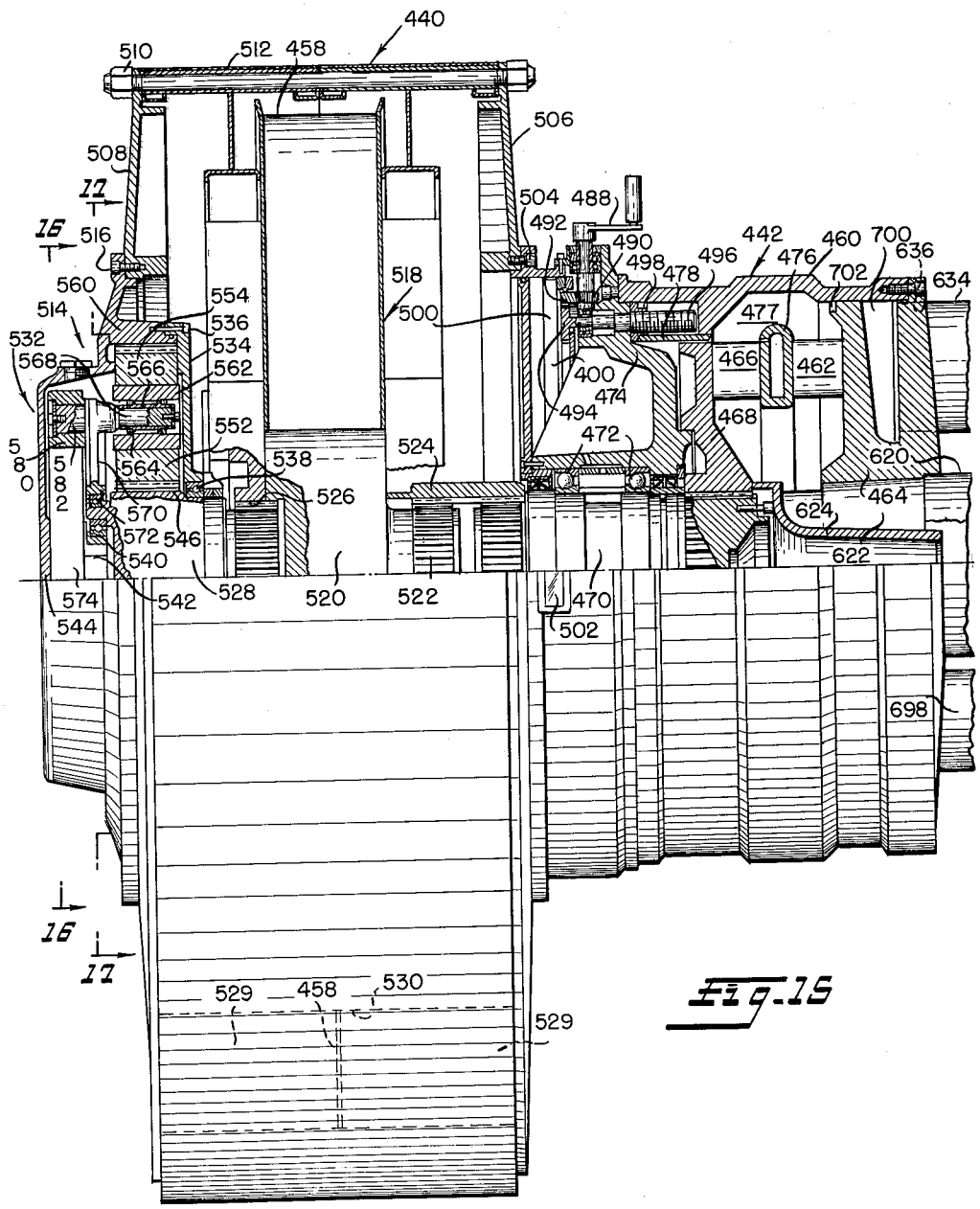

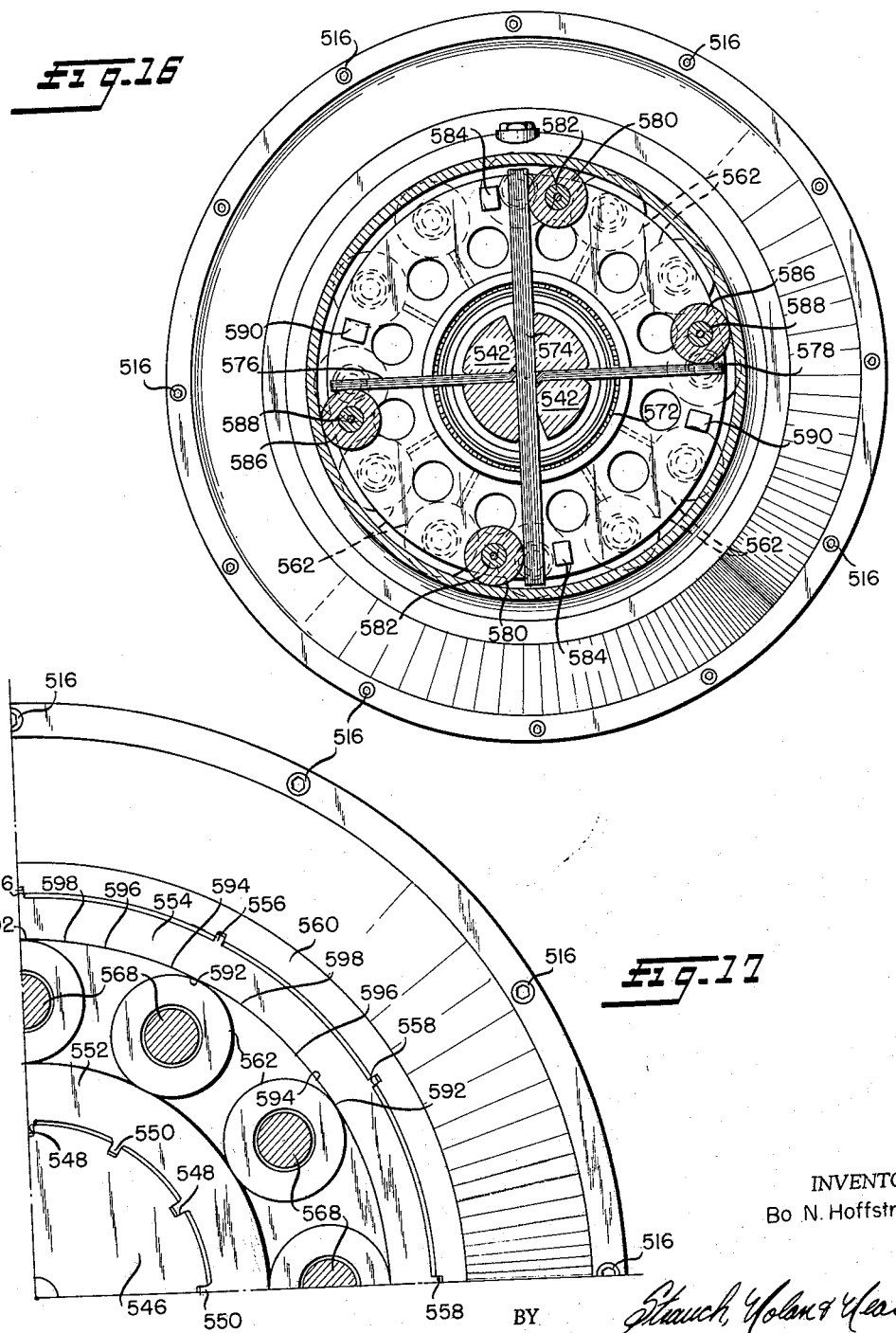

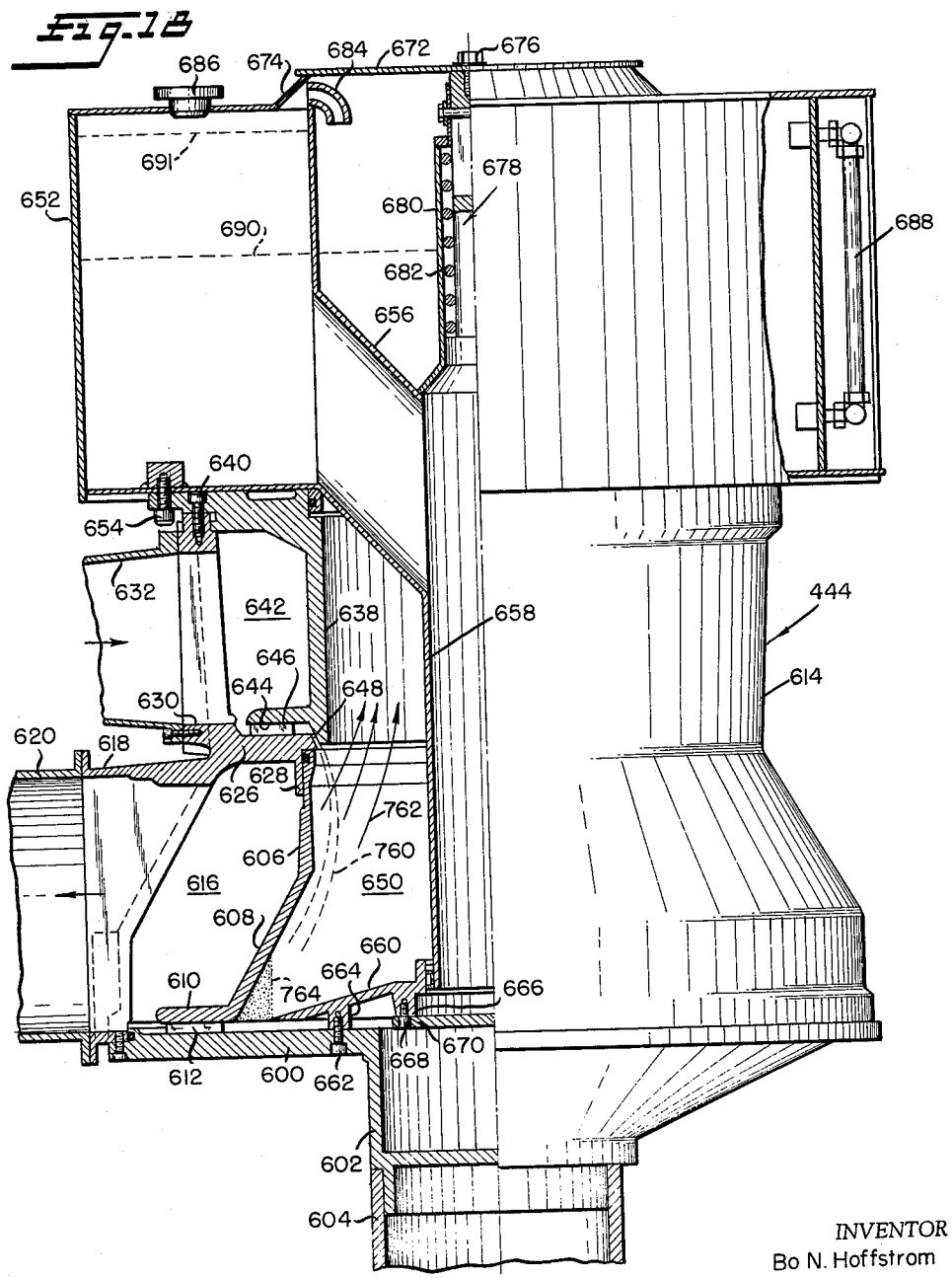

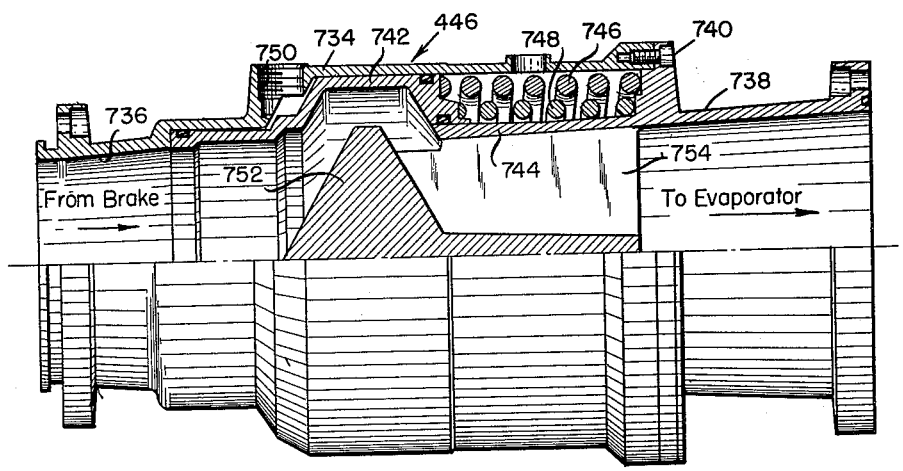
*Fig. 19*
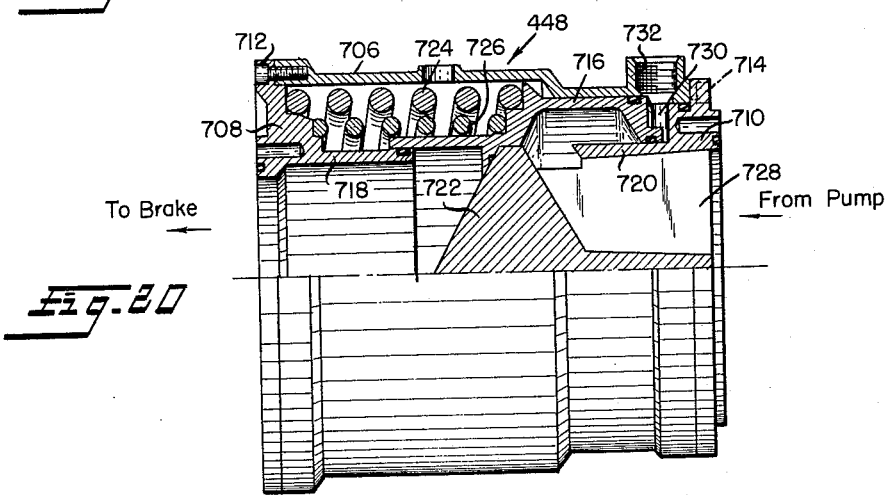
*Fig. 20*
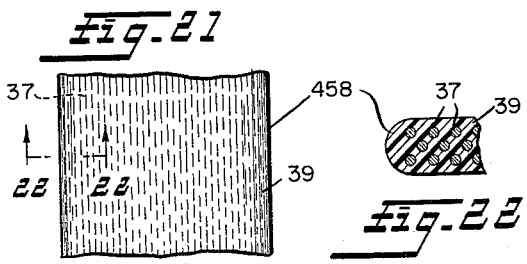
*Fig. 21*
*Fig. 22*
INVENTOR
Bo N. Hoffstrom

United States Patent Office 3,093,352
Patented June 11, 1963

3,093,352
POWER ABSORBING SYSTEMS AND COMPONENTS FOR ARRESTING AIRCRAFT
Bo N. Hoffstrom, Santa Monica, Calif., assignor to Douglas Aircraft Company, Inc., Santa Monica, Calif.
Filed June 6, 1961, Ser. No. 122,307
13 Claims. (Cl. 244—110)

This invention relates to aircraft retarding systems and like systems for absorbing and dissipating power and components such systems and more particularly to such systems and components of the fluid kinetic brake type in which the power to be absorbed is applied to the device as a rotary force and is converted internally into heat energy which is dissipated externally of the device. The invention also relates to power absorbing units which, while they are ideally suited for use in aircraft retarding systems, are of broad utility and general application. Their compactness, simplicity and amenability to precise control recommends them for use wherever power is to be absorbed or where the direct efficient conversion of mechanical power to steam under pressure is desired.

While aircraft retarding systems have been known and used for a number of years, most of these systems are of relatively crude design and are effective only when applied to aircraft of relatively light weight. One such device presently in use by the United States Air Force for land based aircraft comprises a pair of heavy chains located at opposite sides of the runway and connected by a pendant which, when engaged by an aircraft, drags the chains along the ground. Despite the obvious disadvantages of such a system, it is presently in use simply because nothing better is available. Such a system and other present systems are wholly incapable of effectively retarding the much larger aircraft which are now coming into widespread use.

The effective retardation of large aircraft requires a system which is capable of effectively absorbing and dissipating amounts of power which are far out of the range of presently available devices. For example, a device which is capable of stopping in 1,000 feet a 500,000 lb. aircraft which lands at 180 knots must be capable of absorbing and dissipating in a few seconds some 400,000 horsepower or 700 million foot lbs. which is sufficient energy to heat 2500 lbs. of steel from room temperature to the melting point. In addition to absorbing and dissipating these enormous amounts of power, an effective aircraft retarding system must also engage the aircraft without harmful shock, apply a predetermined retarding force, maintain the effective retarding force substantially constant as aircraft speed decreases and satisfy these requirements despite wide variations in the weight of the aircraft and in the speed at which the aircraft lands.

In operation, the retarding force exerted by the retarding system must not exceed a certain multiple of the aircraft weight (i.e., it must not exceed a predetermined number of "g's") and the distance between the point of engagement of the retarding system and the aircraft and the point at which the aircraft is finally brought to rest must not exceed what has been permanently provided for. To avoid unnecessary loads on the aircraft and personnel and on the retarding system, it is also desirable that the maximum retarding distance provided for be utilized. Since the inertia load on the aircraft and its occupants is determined entirely by the "g" force developed and is independent of velocity, the retarding force must not exceed the limiting "g" value at any time as the aircraft slows down nor must it drop below the value required to stop the aircraft in the available retarding distance.

It is an important object of the present invention to provide novel aircraft retarding systems satisfying these and other requirements.

It is also an object of the present invention to provide improved aircraft retarding systems capable of handling aircraft weighing from 10,000 to more than 500,000 lbs. at engaging speeds which may exceed 200 knots.

It is a further object of the present invention to provide improved aircraft retarding systems which compensate automatically for variations in aircraft weight and engaging speed in such a manner that the retarding distance is kept at a constant value which may be preselected as desired.

It is an additional object of the present invention to provide improved aircraft retarding systems including automatic controls which eliminate the requirement for air-to-ground communication and manual setting for individual aircraft and automatically produces retarding loads which are at a minimum value consistent with the allotted runway space.

It is also an object of the present invention to provide improved aircraft retarding systems which are capable of an unlimited number of successive operations even under maximum requirements in which the time interval between successive operations may be less than 30 seconds.

It is an additional object of the present invention to provide improved aircraft retarding systems which have an extended trouble-free service life, have an initial relatively low cost, which permit easy and low cost maintenance and the replacement of components or entire units without disturbing the flight operations.

It is a further object of the present invention to provide improved aircraft retarding systems which are self-contained, air transportable and are suitable for permanent installation as well as for field use.

It is also an object of the present invention to provide improved aircraft retarding systems which are not dependent for the performance of their vital functions upon a source of auxiliary power.

It is an additional object of the present invention to provide improved aircraft retarding systems which do not exert a strong steering action on the aircraft during runout but which rather permit the aircraft to be steered by the pilot in the normal manner.

It is a further object of the present invention to provide improved power absorbing units of the fluid kinetic brake type, the capacity of which may be controlled to an extent not heretofore possible.

It is an additional object of the present invention to provide improved power absorbing devices of the fluid kinetic type which effectively eliminate problems of cavitation invariably associated with prior units.

It is also an object of the present invention to provide improved power absorbing devices of relatively simple construction, which are compact and which lend themselves to cooling by direct internal or external evaporation and thus eliminate the requirements for a separate heat exchanger for this purpose.

It is a more specific object of the present invention to provide improved power absorbers which employ a vortex-type recirculating internal flow where the direction of rotation of the circulating fluid is reversed twice during each pass, once by a set of stationary vanes and once by a set of rotary vanes, the mechanism being effective to form a vortex concentric with the drive shaft having a steep pressure gradient from its inner region toward the outer rim or periphery to thus generate conditions which prevent cavitation of the fluid in the area where the rotor and stator blades are located.

It is a further object of the present invention to provide improved power absorbing systems including novel means for dissipating the power absorbed rapidly and efficiently.

It is also an object of the present invention to provide improved aircraft retarding systems which include a web or strand of novel construction for connecting the power absorbing devices to the aircraft.

It is a further object of the present invention to provide novel aircraft retarding systems comprising one or more power absorbing devices positioned at the side of the runway connected to a strand or web extending across the runway for engagement by the aircraft and novel means for pre-tensioning the strand before engagement by the aircraft.

It is an additional object to provide improved aircraft retarding systems including power absorbing devices and novel control means for operating the power absorbing devices as motors to retrieve the aircraft engaging strand or web at the conclusion of the retarding cycle.

Additional objects will become apparent as the description proceeds in connection with the accompanying drawings in which:

FIGURE 1 is a semi-diagrammatic plan view of one form of the aircraft retarding system of the present invention installed for use on a runway;

FIGURE 2 is an enlarged top plan view of one of the power absorber assemblies of the system of FIGURE 1;

FIGURE 3 is a front elevation of the power absorber assembly of FIGURE 2 also showing a typical mounting for the unit;

FIGURE 4 is an enlarged fragmentary section of one version of the aircraft engaging pendant;

FIGURE 5 is an enlarged front elevation of the power absorber assembly with parts broken away to show interior details;

FIGURE 6 is a transverse section taken along line 6—6 of FIGURE 5;

FIGURE 7 is a vertical half section power absorber unit per se constituting the portion of the unit included by the bracket 7 in FIGURE 5;

FIGURE 8 is a transverse section taken along line 8—8 of FIGURE 7;

FIGURE 9 is a fragmentary section of the power absorber unit showing further details;

FIGURE 10 is a vertical half section of a control unit incorporated in the assembly of FIGURE 5;

FIGURE 11 is a transverse half section taken along line 11—11 of FIGURE 10;

FIGURE 12 is a fragmentary section similar to FIGURE 11 but showing a portion of the lower half of the assembly;

FIGURE 15 is a vertical half section of the power absorber unit incorporated in the assembly of FIGURES 13 and 14;

Figure 13:
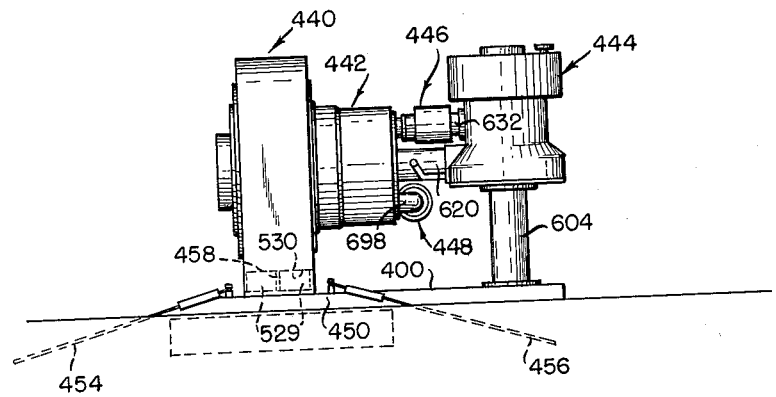
FIGURE 13 is a side elevation of a modified form of the invention.
Figure 14:
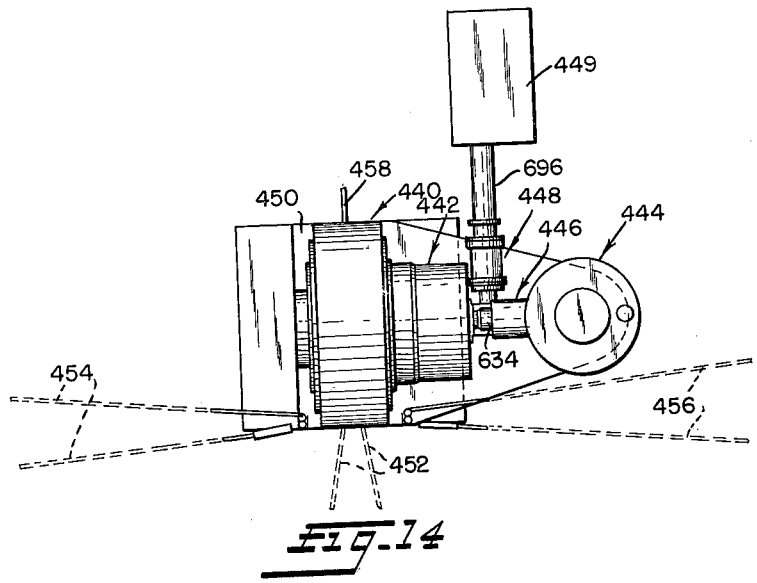
FIGURE 14 is a top plan view of the unit of FIGURE 13.

FIGURES 16 and 17 are vertical sections taken along lines 16—16 and 17—17, respectively, of FIGURE 15 showing details of construction of a novel clutch and pre-tensioning assembly;

FIGURE 18 is a vertical half-section of an evaporator assembly utilized in the apparatus of FIGURES 13 and 14;

FIGURES 19 and 20 are vertical half sections of automatic valve assemblies utilizing the apparatus of FIGURES 13 and 14;

FIGURE 21 is a fragmentary side view of a novel web or strand which forms a component of the retarding system; and FIGURE 22 is a fragmentary section taken along line 22—22 of FIGURE 21.

The aircraft retarding systems of the present invention include as their principal elements one or more power absorber assemblies, a power dissipation system, a control system, a transmission system for delivering the input power developed by the aircraft to the power absorber assemblies and a retrieving system for restoring the units after engagement to a condition for engagement for the next succeeding aircraft.

Referring now more particularly to the drawings, FIGURE 1 shows a typical installation of one embodiment of the overall system in which the power absorber assemblies including the power absorber per se and the associated mechanisms indicated generally at 20 and 22 are located at opposite sides of the runway 24 and are mechanically connected by a pendant assembly 26 which is engageable with an aircraft and is connected at its opposite ends to sets of tapes 28 and 30 which lead directly to the power absorber assemblies 20 and 22, respectively. The components of the system normally occupy the position shown in full lines in FIGURES 1 and 2 and occupy the positions shown in dotted lines when the pendant 26 is engaged by an aircraft travelling in either direction.

As best shown in FIGURE 3, the power absorber assembly 20 is rigidly supported on a concrete foundation 32 firmly embedded in the ground spaced a suitable distance from one side of the runway. The power absorber 22 is similarly mounted. However it is to be understood that other types of mounting may be utilized and in some cases it may be preferable to mount the two power absorbers so that they are substantially entirely underground. In this case the units will be inverted so the tapes 26 and 28 enter and leave the unit from its upper portion.

As shown in FIGURE 4, the pendant 26 is normally received in a recess 34 extending across the runway 24 and comprises a plurality of folded tapes 36, preferably of nylon or fortison 36 encased in a resilient protective cover 38. In a typical installation capable of absorbing a load of 700 million foot lbs., the pendant 26 will comprise six such tapes approximately 3/16" thick and 7" wide when unfolded. Alternately the pendant may be of circular cross section and may comprise a bundle of strands or fibers of nylon, fortisan or like materials embedded in a molded body of elastic material such as rubber or plastic.

Each of the sets of tapes 28 and 30 to which the pendant 26 is connected comprise six nylon tapes in a typical installation 7" wide and 2/16" thick. Nylon is preferred for this purpose principally because of its elasticity and its high strength-to-weight ratio which permits the dead weight and inertia of the system to be significantly reduced.

Other synthetic polymers having equivalent characteristics may be used instead of nylon. Alternately, the tapes may take the form shown in FIGURES 21 and 22. In this construction the tape comprises individual parallel strands 37 of nylon or like material embedded in a solid body 39 of natural or synthetic polymer material. The body 39 is not relied on to provide substantial tensile strength and its principal function is to maintain the strands 37 in a relatively compact body. Preferably the body 39 has at least as much elasticity as the nylon strands 37 to prevent rupture of the body when the nylon stretches.

Any of several known systems for raising the pendant for engagement with the hook of an aircraft may be employed in the system of the present invention. Such systems which are usually automatically actuated by the passage of the wheels of the aircraft over the pendant may employ compressed air or a magnetic field to raise the pendant to the level of the aircraft hook or landing gear quickly and positively.

The power absorbers and associated mechanisms which form the principal components of the system of the present invention and to which detailed reference will now be made comprise a tape reel section 40, the power absorber proper 42 which is shown separately in FIGURES 7 and 8, a control unit 44 shown separately in FIGURES 10 and 11, a retrieving motor 46 and a drive connection 48 between the retrieving motor 46 and the remainder of the assembly.

The tape reel section 40 comprises a series of seven identical cast aluminum frames 50, the frames 50 being secured to each other and to end plates 52 and 54 by a plurality of bolts 56. As best shown in FIGURES 5 and 6, each of these frames 50 comprise a generally circular webbed frame section 58 having four radial webbed spokes 60 which support a hub section 62. Annular Teflon or nylatron-faced guide plates 63 are suitably mounted at opposite sides of the spokes 60 and hubs 62 to form a space for the reception of the coiled tapes. Rotatably supported in suitable bearings on the hub sections 62 are hub members 64 one end of each of which is hollow and is provided with internal splines 65 and the opposite end of which is formed with an integral projection 66 provided with external splines which are received in the splined hub of the next adjacent section. The hub members 64 have an outer cylindrical surface upon which the tape is coiled between the guide plates 63.

Each of the frame sections 50 is provided with a bearing support 70 which aligns with a similar bearing support in the next adjacent section, the two supports mounting a shaft 72 on which a guide roller 74 is rotatably mounted by any suitable bearing assembly, the rolls 74 being disposed directly beneath the tape supporting portions of the hubs 64. Each of the frames 50 also carry a break roller 76 mounted by a conventional bearing construction adjacent the front of the frames for rotation about a substantially vertical axis. The axes of the break rollers 76 are so located that the peripheries of the rollers 76 are in substantial alignment with the midpoint of the guide rollers 74. As best shown in FIGURE 6, the tapes 28 are passed between the adjacent peripheral portions of the break rollers 76 and are twisted through an angle of 90° to pass over the rollers 74 onto the main coil sections at the outer surfaces of the hubs 64.

The retrieving motor 46 which in a typical case is a 30 hp. electric motor is supported by suitable means on an extension of the end plate 52 and is connected through a conventional electro-magnetic clutch enclosed in the housing 80 to a drive shaft 82 the inner end of which is received in a bearing 84 formed in a plate 86 splined to the end of one of the hubs 64. The plate 86 carries a number of planet members 88 which ride along the outer surface of a sun member 90 rigid with drive shaft 82 and along the inner surface of a ring 91 which is connected to the plate 86 by a slip coupling construction 92. The outer surface of the ring 90 is provided with ratchet teeth engageable by a pawl 94 carried by the end plate 52.

When it is desired to wind the tapes initially on the reels or to retrieve the tapes, the motor 46 and the clutch 80 are simultaneously energized to drive the shaft 82 in a clockwise direction as viewed in FIGURE 6. The frictional engagement at the slip coupling 92 is sufficiently high to assure that the shaft, the planet members 88, the ring 91, the plate 86 rotate as a unit to wind the tapes on the reels at relatively high speed. When the tape is fully recovered and stretched across the runway, the continued operation of the motor rapidly increases the tension on the tape. When the tension reaches a predetermined value, the friction coupling 92 begins to slip which tends to rotate the ring 91 in a counterclockwise direction. However such motion is prevented by engagement of the ring with the pawl 94 and the drive systems thereafter operate as a planetary drive system with a relatively high gear ratio, for example 1:12 and the motor torque is thus multiplied substantially to give the desired pre-tensioning of the tape across the runway. When the desired final tension in the tape is reached, the motor becomes overloaded and the increased motor current then trips a relay not shown that de-energizes the motor 46 and the clutch 80. The coils are prevented from unwinding by a novel back stop clutch with an override indicated generally at 96 which is pre-set to maintain the torque produced by the motor. The clutch assembly 96 is automatically released by the substantial increase in the tape tension as the aircraft engages the tape and the coils are then free to turn independently of the motor 46, the clutch 80 and the clutch 96 solely under control of the power absorber 42 which will now be described in detail.

The main power absorber housing member 100 is secured by a plurality of bolts 102 to a ring 104 attached by a plurality of bolts 106 to the end cover 54, support rings 108, 110 and 112 being clamped between the ring 104 and the main housing 100. The housing for the power absorber is completed by a member 114 secured to the end of the main housing member 100 by a plurality of studs 116, an end housing member 118 secured to the member 114 by a plurality of studs 120 and an end cover member 122 secured to the housing member 118 by a plurality of studs 124.

The rotor shaft 126 of the power absorber is drivingly connected to one of the hub sections 66 of the tape reel section by a splined sleeve 128 and is rotatably supported in a main bearing 130 carried by the intermediate ring 112. The shaft 126 is also supported in an additional bearing 132 carried by a support ring 134 which is suitably connected by a plurality of circumferentially spaced fins 136 to an outer ring section 138 mounted on an inwardly projecting flange 140 formed integrally with the main housing member 100. A ring 142 is splined to the drive shaft 126 for rotation therewith and is clamped between the inner race of bearing assembly 130 and a ring 144 secured to the drive shaft by a plurality of circumferentially spaced studs 146. Formed integrally with the ring 142 is a plurality of rotor blades 148, the outer ends of which are formed integrally with an annular end wall 150 which is received in close clearance relation in a recess formed in a mating annular end wall 152 formed integrally with the ends of a series of stator blades 154, the opposite ends of which are formed integrally with or rigidly secured to a ring 156 secured to the flange 140 by studs 158 and dowel pins 159. The annular walls 150 and 152 constitute a ring assembly separating the adjacent ends of the rotor and stator vanes. The rotor blades 148 and the stator blades 154 are positioned in an annular chamber 160 which is generally oval in section and is formed by the annular arcuate surface 162 of the main housing member 100, the ring 142, the ring 156, the inclined surfaces formed on the respective rings 144 and 140 and an axially projecting annular flange 164 formed on the ring 134.

An evaporation chamber 170, which is in open communication with the atmosphere through an outlet conduit 172 formed integrally with the housing member 118, is bounded on its outer surface by a cylindrical surface 174 formed on the housing member 100 and on its inner surface by a tube 176 carried by the end cover plate 122 and on its inner end by a radial plate 178 which is connected by a series of circumferentially extending straight vanes 180 to an inwardly tapered ring 182 mounted on a flange of the housing member 100 by a plurality of screws 184. The lefthand surface of the fixed tapered ring 182 is in close clearance relation with the tips of circumferentially extending pump vanes 186 formed integrally with a support plate 188 which is splined to the main shaft 126 and held in place by a clamp ring 190 secured to the of the shaft 126 by a nut 192. The inner surface of the disk 188 in turn travels in close clearance relation with the outer tips of a plurality of circumferentially extending straightener vanes 194 formed integrally with a plate 196 secured to a flange on the main housing member 100 by a plurality of screws 198. Water is supplied from a suitable source through an inlet fitting 200 in the cover plate 122 and through an inlet tube 202 the opposite end of which is supported by a member 204 which is provided with a plurality of radial apertures 206 and which also carries the inner end of the tube 176.

The operation of the power absorbing unit of FIGURES 7 and 8 will now be described assuming that the unit is rotated in a counterclockwise direction as viewed in FIGURE 8 with a velocity $v_b$ while the inlet 200 is connected to a suitable source of water supply and the outlet pipe 172 is connected to atmosphere. The rotor blades 148 intercept a portion of the water which substantially fills the chamber 160 and drives the intercepted body of water tangentially of the chamber 160 with a velocity $v_2$ which soon becomes substantially greater than the velocity of the rotor blades. As the rotation of the blades progresses, a vortex is formed with a core and a steep pressure gradient is established between the center of the vortex rising to a maximum value at the circumferential outer surface or rim of the chamber 160. A portion of the fluid is caused to follow the path indicated by the arrow 210 so that the water flows into the region of the stator blades 154 and is intercepted by these blades. Its direction is reversed by the blades 154 and the water is again disposed in the path of the rotor blades 148 where its direction is again reversed. Thus the direction of rotation of the water is reversed twice during each pass, once by the stationary vanes and once by the rotor.

Each time the fluid passes the rotor blades 148, its tangential velocity is increased by an amount proportionate to the rotary speed of these vanes. The velocity of the fluid and the volume flow rapidly increases until the velocity gain in the rotor is exactly offset by frictional losses in the circuit with the result that a very high torque is produced for given dimensions.

Throughout the operating cycle the tangential velocity $v_2$ of the water is many times higher than its velocity in the direction of the arrow 210.

In the power absorber of the present invention, advantage has been taken of the radial pressure gradient inherent in the vortex flow established in the main power absorber chamber 160 to prevent the danger of cavitation which occurs when the velocity head exceeds the difference between the local static fluid pressure and the vapor pressure of the liquid at the prevailing temperature. Since, in a vortex, the static pressure increases with the radius from the center of the vortex while the velocity head decreases, there is in any vortex a radius beyond which cavitation cannot occur. The rotor blades 148 and the stator blades 152 are placed outwardly of this critical radius and operate there without any danger of cavitation.

The power absorbed by the unit is given by the equation $$\frac{F}{g}(v_1+v_2) \times v_b$$

where F is the fluid flow (weight per unit time), $v_1$ is the velocity at which the fluid enters the rotor blades, $v_2$ is the velocity at which the fluid leaves the rotor blades and $v_b$ is the rotary velocity of the rotor blades.

Because of the unique construction of the power absorber, it is ideally suited to permit automatic dissipation of this heat thus generated through evaporation of the water without the danger of cavitation at any critical point in the system. A portion of the highly heated water is permitted to bleed through the annular opening 212 formed at the outer surface of the plate 156 and passes through a plurality of axially extending passages 214 formed in the main housing member 100 and through a plurality of tangential openings 216 formed in a ring 218 clamped between the end plate 114 and the adjacent end surface of the housing member 100. The water then passes through the annular opening 220 formed between the inner surface of the ring 218 and a projecting flange 222 formed on the plate 114 into the chamber 170. The water emerges from the annular opening 220 as a conical curtain indicated at 224 and forms a ring of water to the level approximately indicated by the reference line 226. Because of the substantial reduction in pressure within the chamber 170, a sufficient amount of the water, for example 10%, evaporates so as to reduce the temperature of the remaining body of water forming the ring 226 to a value correspondnig to the boiling point. The resulting steam passes in a cylindrical chamber formed by a flange 227 on the member 114. Because of the rotary motion of the fluid, any droplets are thrown against flange 227 and pass through an annular opening 229 into a recovery chamber 231 and thence through pipe 233, tube 176 and openings 235 back to the main system. The remaining steam is permitted to exit from the unit through the outlet 172. The remaining water passes radially inwardly along the straightening vanes 180 until it reaches the inner end of the separator 182 where it is picked up by the rotary pump vanes 186, passes radially outwardly and then passes radially inwardly over the stationary straightening vanes 194 which convert tangential velocity to pressure head, thence over the fins 136 and again into the main power absorbing chamber 160.

Makeup water is supplied from a suitable source under pressure through tube 202 and passages 206 to the area adjacent the inner ends of vanes 180.

Any air contained in the water is bled from the inner core portion of the chamber 160 through the annular passage 228 thence to radial passages 230 formed in the main shaft 126 through the hollow interior of the shaft thence to the evaporation chamber 170 through axially extending vent holes 232 formed in the member 204.

In addition to eliminating the problems of cavitation associated with prior devices of this kind, and in addition to the significant advantage of being inherently self cooling and providing for rapid dissipation of heat energy without the use of a heat exchanger, the unit of FIGURES 7 and 8 has a further significant advantage over all known prior units in that its capacity can be controlled easily and simply to provide a very wide range of capacity. For example, the capacity of the unit of the present invention can be readily decreased to 1/100th or less of its total rated capacity. This control is achieved by an annular throttle ring 240 which is mounted for axial sliding movement between cylindrical surfaces of the ring 112 and the housing member 100. When the unit is operated at its full rated capacity, the ring 240 occupies its retracted position as shown in full lines in FIGURE 7 and when the unit is to be operated at reduced capacity, the ring occupies an extended position as shown in dotted lines in FIGURE 7. In this latter position, the function of the control ring is to reduce the rate of circulation between the stator blades and the rotor blades in the direction of the arrow 210.

The axial position of the throttle ring 240 is controlled by a plurality of screws 242 (one shown) to the outer ends of which pinions 244 are non-rotatably secured. Pinions 244 are synchronously driven in one direction or the other by two planetary gear systems 246 and 248 driven by the main shaft 126. The planetary gear systems may effectively idle or may be effective to drive the pinions 244 in one direction or the other, depending upon the energization of hydraulically operated pistons which selectively lock portions of the planetary systems.

The planet system 246 comprises a sun gear 250 driven by the main shaft 126, a plurality of planet gears 252 rotatably supported on a carrier 254 and a ring gear 256. The planet gears are non-rotatably associated with drive gears 258 which mesh with pinions 244.

The planet system 248 comprises a sun gear 260 carried by shaft 126, planet gears 262 rotatably supported on a carrier 264 and a ring gear 266 formed integrally with the carrier 254.

The ring gear 256 and the carrier 264 are mounted for free rotation and are selectively locked against rotation by pistons 270 and 268 respectively to produce rotation of the pinions in the selected direction. The pistons 268 and 270 are selectively energized by a fully automatic control unit 44 illustrated in FIGURES 10, 11 and 12, to which detailed reference will now be made.

Essentially the control unit functions to establish and maintain a constant rate of deceleration which brings the aircraft to a stop at the end of a predetermined roll-out distance. To this end, the control unit includes an element sensitive to the engagement speed of the aircraft and a second element sensitive to its rate of deceleration. The control function is thus independent of the weight of the aircraft and automatically compensates for the aircraft landing speed. Thus the need for communicating information regarding the speed and weight of the aircraft to the ground crew is eliminated and the ground crew is relieved of the responsibility of performing manual adjustments in preparation for operation of the system. No known prior system is capable of achieving this result.

The control unit comprises a main housing member 300 secured by suitable means (not shown) in concentric relation with the axis of the rotors 74 in the tape reel section. An additional housing member 302 is secured by suitable means (not shown) to the housing member 300. Non-rotatably supported within the internal bore 304 of the housing member 302 are bearings 306, 308 and 310 which are separated by appropriate spacer members 312, 314, 316 and 318, the spacers 314 and 316 bearing against opposite sides of a ring member 320 and the spacer 318 bearing against a radial flange of a ring member 322 carried by suitable bores in the housing 300. Rotatably carried by the bearing 310 and a bearing 324 supported in the member 322 is the outer element 326 of the hydraulic drag device indicated generally at 328, which is essentially the same as the corresponding portion of the power absorber. Rigidly secured as by screws 330 to the member 326 is a spider 332 which carries a plurality of studs 334 which carry bearings 336 rotatably supporting planet rings 338. The member 326 also carries a plurality of rotor vanes 340 which are rigid with a contoured spacer 342. A mating annular spacer 344 is formed integrally with stator vanes 346 which are rigid with a ring 348 carried by a tubular shaft member 350 rotatably supported at one end by a bearing 352 carried by the spider 332 and at its opposite end by a bearing 354 carried by the housing member 302. Interposed between the bearings 354 and the shaft 350 is a second tubular shaft 356 carrying a bearing 358 rotatably supporting a rotary mass ring 360.

The ring 362 which rides on the outer surfaces of the planet gears 338 is clamped between flanges on ring members 364 and 366 which are held together by screws 368 and are rotatably supported in the bearings 306 and 308. An extension of the member 366 is rigidly secured to the outer end of a torsion spring 370, the inner end of which is rigidly secured to the shaft members 350 and 356. A brake assembly comprising a ring 372 rotatable with the shaft 356 and a hydraulic piston assembly 374 received in a chamber 376 formed in the housing 302 enclosed by a suitable cap 377 is provided to control the extent of the angular rotation of the shaft assemblies 350 and 356 and thus determine the relative angular position of the center of the spring 370. An extension 378 of piston 374 is normally held in frictional engagement with the periphery of member 372 by a spring 379.

The outer surface of a radial flange on the member 364 is provided with a cam surface 380 which supports a plurality of cam followers 382 rotatably carried by shafts 384 supported in the bifurcated ends of levers 386 pivotally supported by shafts 388 carried by the ring 320. Each of the members 386 actuates a radially extending rod 390 which projects through aligned openings 392 and 394 formed respectively in the ring 320 and bosses 396 formed integrally with the housing 302. The outer ends of the rods 390 are provided with valve closure elements 398 which control the passage of hydraulic fluid supplied under pressure to an inlet opening 399 in the housing 300, passages 400 and 401 formed in the housing 302, the latter passage leading to the chamber of the brake device 374.

As shown in FIGURE 12 the member 364 is provided with a radial projection 402 which extends between the side walls of the member 302. Movement of the ring 364 is limited by pins 403 and 404 mounted in the ring 302. The ring 364 is urged toward a central position by a follower 405 which is positioned by a spring 406 which rests against a fixed stop 407. The follower 405 is shown in its limit position against pin 403.

While the bosses 396, the closure caps 408 and the mechanism enclosed in the bosses 396 are identical, it will be noted that the cam surface 380 is so arranged with respect to the bosses 396 and the cam followers that when one of the cam followers is in the dwell of the cam surface, each adjacent cam follower is positioned opposite the peak of the cam surface. Thus the valves are actuated in alternate pairs. Alternate ones of the valves are connected by conduit means not shown to pressure connections 408 and 410 formed in the plate 104 and the ring 110 respectively leading to the respective pistons 268 and 270 for ultimately controlling the direction of rotation of the screws 242 and thus the position of the throttle member 240.

The effective capacity of the hydraulic drag unit 328 is controlled by a manual adjustment comprising a shaft 412, the inner end of which carries a throttle member 414 and the opposite end of which is threaded onto the shaft 350. A control knob 418 is non-rotatably secured to the outer end of the shaft 412 and is provided with a collar portion 420 provided with suitable indicia cooperating with corresponding indicia on an extension of member 422 carried by the shaft 356 so the setting of the member 420 can readily be determined. Rotation of the control knob 420 moves the shaft 412 to the left from its fully retracted position shown in FIGURE 10 to dispose the control element 414 in throttling position to decrease the drag exerted by the assembly 328. Rotation of the control knob 420 in the opposite direction produces the opposite result. The operating fluid for the hydraulic drag device 328 is preferably water which is supplied from a suitable source (not shown) through an inlet conduit 424 and registering passages 426 and 428 in the members 322 and 326 respectively. A drain bleed is provided at 429.

Preferably the control unit of FIGURES 10 and 11 is applied only to the power absorber 20 which may be regarded as the master unit. Control of the other power absorber 22 which may be termed a slave unit is effectd by directly hydraulically connecting the power absorber chambers 160 of the two units. It is a feature of the power absorber units that the output torque is a direct function of the hydraulic pressure developed in the chamber 160 irrespective of the speed of the unit. Thus the master and sleeve units will exert exactly the same drag as long as these pressures are maintained equal since the units are physically identical. This can be accomplished by connecting conduits to predetermined points within each of the chambers 160, for example the outer rims of these chambers, and utilizing any differential pressure to operate the brake pistons controlling the position of the throttling member 240 in the slave unit to match its output exactly to the output of the master unit so that each unit will develop exactly the same force in the attached portion of the nylon tape. These forces will remain equal even if the speed of the two units should be slightly different, for example due to an off-center engagement of the aircraft with the pendant.

The operation of the embodiment of the system shown in FIGURES 1–12 will now be described. To ready the system for operation, the pendant is stretched tightly between the two power absorber units, the units are properly supplied with water and the control knob 420 set to permit the desired roll-out. It may also be assumed that the throttle rings 240 in the master and slave units 20 and 22, respectively, each occupies a closed position so that the output of these two units and accordingly the drag they exert on the tape is at a minimum. When an aircraft engages the pendant 26, the tapes 28 and 30 are rapidly accelerated and the power absorbers and the control unit begin to revolve at a rapidly accelerating rate. As soon as the control unit 44 begins to accelerate, the relatively massive member 360 tends to lag the speed of the drive shaft carrying the planet members 338. Since rotary acceleration is high, the inertia force is also relatively high. Assuming that the direction of rotation of the components is such as to shift the axis of planets 333 in a counter-clockwise direction as viewed in FIGURE 11, the relative lag of the member 360 causes the cam 364 to move in the same direction causing projection 402 on the cam to compress spring 406 and shift the cam relative to the housing 302 against positive stop 403. This action opens certain of the valves 393 to move the power absorber throttle ring 240 to the closed position if it does not already occupy this position and to release the brake 374 which normally holds the member 372 stationary. Since the cam 364 and the ring 362 are no longer free to move, the rotary mass 360 is rapidly accelerated to a speed substantially higher than the speed of the roller 74 which drives the control unit.

As the units continue to accelerate, the torque transmitted through the hydraulic drag device 328 to the center of the pretensioning spring 370 increases with the square of the velocity of the tape.

Since the outer end of the spring 370 is held against rotation, the spring becomes increasingly tensioned. Since the torque transmitted by the hydraulic drag device 328 to the center of the spring increases with the square of the velocity, the tension of the spring at any time is a function of the square of the tape velocity at that time.

When the initial engagement period ends, tape velocity reaches its maximum value which equals that of the aircraft and acceleration becomes zero. At this instant, the cam retracts from the positive stop and the mechanism enters its control regime. This action engages the brake 374 and fixes the position of the inner end of the spring 370 with the spring under a tension which corresponds to the square of the velocity of the aircraft when the preliminary engagement period has ended and the tape has reached full velocity. This spring force is transmitted to the cam which shifts the cam to operate certain of the valves 398 to move the throttle member 240 to the left as viewed in FIGURE 6 and thus apply a retarding force to the tape. As the retarding force increases, aircraft deceleration and thus the tape deceleration increases. As a result, the mass 360 tends to run ahead of its drive and is restrained from doing so only by the force exerted by the spring 370. When the deceleration reaches a value where the rotary mass inertia force exerted by the member 360 equals the opposite force exerted by the spring 370, the rotary mass member 360 acting through the planet gears 328 shifts the cam 364 to stop the movement of the throttle 240 in the power absorber. Further cam motion in the same direction causes the throttle 240 to move in the opposite direction to reduce the deceleration, thereby reducing the effective rotary mass force and to permit the cam to return to its neutral position. Thus during the retarding period the control unit tends to maintain equilibrium between rotary mass inertia force and torque spring force. This equilibrium is independent of aircraft weight and depends only upon aircraft deceleration. Thus a predetermined deceleration is maintained as long as the corresponding force is within the range of the power absorber controllability.

The magnitude of the deceleration is in turn determined by the pretensioning given the spring 370 by the hydraulic drag device 328. Since the characteristics of the drag device are such that its torque is proportionate to to the square of aircraft velocity, it follows that deceleration during the retarding period is proportional to the square of the engagement velocity. This is a requirement for constant retarding distance which thus will be maintained by the control unit independent of the speed at which the aircraft engages and independent of the weight of the aircraft.

Since, as pointed out above, the output of the hydraulic drag device 328 can be adjusted by the knob 418, the equilibrium between rotary mass inertia force and the spring pretensioning force will occur at a different aircraft deceleration for any given engagement speed which in turn varies the roll-out distance in accordance with the setting of the knob 418. It is to be particularly noted that since the speed at which the control unit 44 is driven is determined by the speed of the rolls 74, the system is rendered entirely independent of any effect which may be produced by variations in the size of the reels on which the tape is coiled.

It is also important to note that the initial shock resulting from engagement between the aircraft and the pendant is substantially reduced since the power absorber initially runs substantially free and since the tapes are coiled and in this form their inertia is less than 70% of the inertia of the tapes if they were stretched out full length. The inertia of the tapes is further decreased by the fact that they are fabricated from nylon rather than steel which represents a substantial reduction in weight for a given strength. Further, as the tape uncoils, it progressively stretches and thus the part of the kinetic energy of the aircraft is absorbed directly by the tape and the recovery of the tape aids in stopping the aircraft at the limit of its travel when the speed of the aircraft has fallen substantially to a speed, for example 5 or 10 m.p.h., where the capacity of the power absorber rapidly decreases.

During the retardation of the aircraft, the power absorber of FIGURES 7 and 8 functions in the manner described above and substantially all of the kinetic energy of the aircraft is converted to heat energy which is absorbed by evaporation of water which exits from the system in the form of steam from the outlet opening 172. Steam can be vented to the atmosphere or can be used for heating or cooling or for power generation purposes or stored in a steam accumulator to be used later, for example to assist the take-off by means of a steam catapult.

A modified form of the invention is illustrated in FIGURES 13–22 to which detailed reference will now be made. Basically the modified form of the invention is the same as the form described above. However the modified form of the invention includes an external heat dissipation unit in the form of an evaporator shown in detail in FIGURE 18; a manual control best shown in FIGURE 15; a modified pretensioning clutch assembly shown in FIGURES 15, 16 and 17; a system for driving the power absorbers to retrieve the tape, the system incorporating the valve units shown in FIGURES 19 and 20, and an improved tape construction shown in FIGURES 21 and 22.

FIGURES 13 and 14 illustrate the combined brake, tape reel, retrieve and pretensioning units which are positioned at opposite sides of the runway, in a form particularly adapted for military use, i.e. the units are self-contained and designed for transportation by air to the installation site. The complete braking unit, excluding ground anchors, weighs about 5,000 lbs. and can be installed without disturbing the runway area.

The units include a combined tape reel and clutch assembly 440, the hydrodynamic brake indicated generally at 442, the evaporator indicated generally at 444, two major valve assemblies 446 and 448, and a pump 449 mounted on a common base 450 preferably set on the top of the ground. The units are held in place by cable systems 452, 454 and 456 which are connected to suitable buried anchors (not shown). The total time for installation depends on the manpower available and soil conditions, but normally does not exceed four hours. For a permanent installation the units are bolted to concrete foundations. In the installation shown in FIGURES 13 and 14 the tape 453 leaves the tape reel section 440 at ground level. However, if preferred, the brake units may be inverted and mounted in a recessed location.

The hydrodynamic brake 442, which is enclosed in a main housing member 460, is of essentially the same construction as the brake unit shown in FIGURE 7 and comprises a series of curved stator vanes 462 carried by a double walled end plate member 464 and a series of oppositely curved rotor vanes 466 carried by a member 468 splined to a shaft 470 rotatably supported on bearings 472 in an end housing member 474. The adjacent ends of the stator vanes 462 and 466 are separated by a toroidal core member 476 carried by the outer ends of the stator vanes 462 to form an annular working chamber 477 as described in connection with the previous embodiment.

Also as in the previous embodiment, the capacity of the hydrodynamic brake is controlled by an annular throttle ring 478 shown in FIGURE 15 in its fully retracted position. While the position of the throttling ring may be controlled by the mechanism described in connection with the previous embodiment, the control mechanism shown in FIGURE 15 provides for manual operation. For this purpose a manually operable control member 488 is provided and carries at its inner end a gear 490 in driving engagement with a ring gear 492, the inner periphery of which engages any suitable number of pinions 494 (one shown) which rotate screws 496 to produce axial movement of nuts 498 which are rigidly connected to the throttle ring 478. Preferably a scale 500 is carried by the control ring 492 to permit visual observation of the setting of the unit through a window 502. The brake housing assembly is secured by screws 504 to the side wall member 506 of the tape housing 440. Clamped between the wall member 506 and an identical opposite wall member 508 by a plurality of bolts 510 is a housing assembly 512.

A pretensioning clutch assembly indicated generally at 514 described in detail below is secured to the end wall member 508 by a plurality of screws 516. The tape 458 is coiled on a reel structure indicated generally at 518 which includes a hub 520, having at one end a splined projection 522 which fits within an annular coupling ring 524 splined to the end of the brake rotor shaft 470. At its opposite end the hub 520 is provided with a splined blind bore 526 for driving connection to the central clutch shaft 528.

As in the previously described embodiment, the construction of the hub and the tape housing permits the installation of as many reel sections as desired in side-by-side relation. The tape 458 leaves the tape housing through an opening 530 provided for this purpose, the tape being guided for passage through this opening by rollers 529 similar to the rollers 74 and 76 described above.

The clutch assembly 514, as explained in greater detail below, is provided for the purpose of maintaining the tape stretched across the runway with a predetermined amount of tension for engagement by the aircraft. High tape pretension is utilized to increase the speed with which the shock waves caused by engagement of the aircraft pass to the reel assembly to reduce the engagement shock. The clutch assembly is of novel construction and is disclosed and claimed in copending application Serial No. 104,353 filed April 20, 1961 for Planetary Mechanisms. Accordingly, the clutch will be described herein only to the extent necessary to facilitate an understanding of the overall system.

The clutch mechanism is enclosed within a dish-shaped housing member indicated generally at 532 closed by a plate-like cover member 534 detachably secured to the main housing member 532 by a plurality of bolts 536. A circumferential flange of the main housing member is secured by the bolts 516 to the member 508.

The hub 528 is mounted for rotation coaxially of the housing member 532 on a front bearing assembly 538 carried in a central opening in the cover plate 534 and a rear bearing assembly 540 supported on a boss 542 formed integrally with the bottom wall 544 of the housing member 532. The enlarged central portion 546 of the hub is provided with a plurality of radial notches 548 into which slidably extend tongue members 550 formed integrally with the inner periphery of a sun ring 552. Radial clearance permits the sun ring 552 to flex radially to some extent in operation and to center itself automatically with respect to the remainder of the mechanism.

The outer ring member 554 is provided with a plurality of radially projecting tongues 556 which are slidably received in corresponding notches 558 in the circumferential wall portion 560 of the main housing member 532. Again, a slight radial clearance is provided to permit radial flexing of the ring 554 and to permit the ring to become centered automatically around the axis of the shaft 528.

The planets 562 are of cylindrical form and are rotatably mounted at equally circumferentially spaced locations around the axis of the shaft 528 on resilient discs 564 carried by a collar 566 journalled on a stub shaft 568 formed integrally with a spider 570.

The hub of the spider 570 is supported on a bearing assembly 572 carried by an extension of the shaft 528. The spider 570 is resiliently restrained against free rotation and is biased toward a predetermined angular position. This is accomplished by oppositely acting sets of leaf springs 574, 576 and 578. The springs 574 extend diametrically across the apparatus through a slot formed in the housing boss 542. The outer ends of the springs bear against a pair of symmetrically positioned rollers 580 which are journalled on stub shafts 582 formed integrally with spider 570. Because of the relative positioning of the springs and the rollers 580, the springs 574 are effective to yieldably oppose rotation of the spider in a counterclockwise direction as viewed in FIGURE 16. Rotation of the spider in this direction is positively limited by a pair of symmetrically opposite stops 584 formed integrally with the housing 532 and projecting into the path of the ends of the springs 574.

The relatively light sets of springs 576 and 578 extend through radial slots in the housing boss 542 and their inner ends are bent as shown to retain them in place. The outer ends of the springs 576 and 578 bear against a pair of symmetrically opposite rollers 586 journalled on stub shafts 588 projecting from the spider 570 in the same manner as the rollers 580. The spring sets 576 and 578 are effective to resiliently oppose motion of the spider in a clockwise direction as viewed in FIGURE 16, the limit of motion in this direction being determined by stops 590 carried by the housing 532 and projecting into the path of the springs 576 and 578 as they are deflected.

As best shown in FIGURE 17, the inner surface of the outer ring 544 is provided with a plurality of cams, the cams being the same in number and having the same circumferential spacing as the planets 562. In the example shown, twelve are employed, each having a circumferential length of 30°. Each cam comprises a peak 592, a steep cam rise 594, a dwell portion 596 and a shallow rise section 598. In a typical case the shallow rise section has an angular extent of 22°, the dwell extends 5° and the steep rise extends 3° along the inner circumference of the ring 554. The sets of springs are so arranged with respect to the cam surfaces that the former are unloaded as shown in FIGURE 16 when the planets are in engagement with the cam peaks 592 as shown in FIGURE 17. The heavy springs 574 are deflected in a counterclockwise direction from the position shown in FIGURE 16 and the relatively light springs 576 and 578 are deflected when the planets are moved in the opposite direction. Further, the stops 584 and 590 are so positioned that the planets may be circumferentially shifted in either direction from the position shown until they are opposite the dwell portion of the cam in which location the planets run free between the sun ring 552, and the outer ring 554. The operation of the clutch will be described in detail below in connection with the description of the operation of the overall system.

The invention also comprises a novel evaporation and replenishing system, a principal component of which is the evaporator assembly 444 shown in detail in FIGURE 18. This evaporator assembly is disclosed and claimed in copending application Serial No. 104,567 filed April 21, 1961 for Evaporators to which reference may be made for details of construction omitted for clarity from the present description.

Essentially the evaporator 444 comprises apparatus effective to convert the pressure energy of the incoming stream of water delivered from the hydrodynamic brake to kinetic energy to create a revolving fluid vortex. The revolving body of water is passed through a restricted opening into an evaporation chamber where it forms a revolving axially moving curtain. As the water is fed into the evaporation chamber, the pressure drops instantaneously and a portion of the water curtain is vaporized, reducing the temperature of the remaining water. The apparatus then forms the unevaporated portion of the water into a solid ring in a manner to generate static pressure, the pressurized water being returned to the hydrodynamic brake.

The evaporator assembly 444 is supported on a base plate 600 having a central depending boss 602 adapted for attachment to a tubular support 604. Cemented to or otherwise suitably secured to the base plate 600 is an annular sleeve member 606 having an intermediate conical surface 608 terminating at its lower end in an outwardly projecting flange 610. Milled from or otherwise formed integrally with the bottom surface of the flange are a plurality of radial diffuser vanes 612.

A main housing member indicated generally at 614 is sealingly secured to the base plate 600. The lower portion of the housing member is of generally conical configuration and forms with the inner sleeve member 606 an annular fluid collection space 616. At one circumferential location the conical wall of the housing member is interrupted by a hollow boss 618 which forms a fluid outlet of essentially the same area as the area of the annular passage through the diffuser vanes. The boss 618 is connected to conduit 620 leading to an annular opening 622 in the brake assembly formed between the member 464 and a conical throat member 624.

Adjacent its vertical midpoint, the housing member 614 is provided with an inwardly projecting radial flange 626 having a downwardly projecting flange 628 mounted on the upper end of the inner sleeve member. Above the flange 626, the housing member 614 is of generally cylindrical configuration and is provided with a fluid inlet opening 630 connected by a short conduit 632 to one side of the valve assembly 446, the opposite side of which is connected by a fitting 634 to an opening 636 formed in the housing member 464 of the hydrodynamic brake.

An upper inner sleeve member, indicated generally at 638, is secured to the upper end of the housing member 614 by a plurality of screws 640 and forms with the upper portion of the housing member an annular fluid inlet chamber 642. At its lower end the water inlet chamber 642 is in communication with the interior of the lower sleeve member through an annular channel 644 across which a plurality of tangential vanes 646 extend.

At its inner end the channel 644 terminates in a downwardly directed fluid injection slot 648. As explained in detail below, the fluid to be evaporated flows through this slot into an evaporation chamber 650 bounded by the inner surface of the lower sleeve member 606.

The evaporator assembly also incorporates an automatic fluid replenishment system which includes an annular fluid storage chamber 652 secured to the upper sleeve member 638 by a plurality of screws 654. The inner periphery of the fluid storage chamber is connected by inclined conduits 656 to the interior of a central sheet metal tubular member 658. Preferably the conduits 656 are of streamlined configuration in cross-section to eliminate any substantial obstruction to the upward flow of vapors released in the evaporation space 650. The lower end of the central tube 658 is sealingly received in an adapter plate 660 secured by screws 662 to the base plate 600, the screws extending into a plurality of circumferentially spaced bosses 664 in the adapter member. An annular inner ring of circumferentially spaced bosses 666 is formed on the lower surface of the adapter member 660 to receive screws 668 which retain a bottom cover plate 670. Thus the flow of fluid into or out of the bottom end of the tube 658 is confined to a radial path between the bosses 664 and 666.

The upper end of the evaporation chamber 650 is normally closed by a top cover plate 672 which rests on a conical lip 674 formed at the upper edge of the water storage chamber and is rigidly attached by a screw 676 to the upper end of a piston 678 mounted for vertical sliding movement in a cylinder 680 which forms an extension of the fluid supply tube 658. The cover 672 is normally retained in its closed position by a spring 682 which is sufficiently light to permit free upward movement of the cover under a slight differential pressure.

The space above the fluid in the chamber 652 is connected to the evaporation space by a number of tubes 684 which effectively transmit the total pressure in the evaporation space. The apparatus is completed by accessories including a standard pressure relief cap 686 and a water level gauge 688.

The apparatus may be readied for operation by filling it with water to approximately the level of the middle portion of the sight gauge 688 as shown by reference line 690.

As stated above, this form of the invention also includes a system for operating the hydrodynamic brake assemblies as turbines to retrieve the tape at the end of the retarding cycle to prepare the system for engagement with an aircraft.

Essentially this mechanism comprises a pump for delivering water under pressure in a reverse direction through the hydrodynamic brakes, the valve assemblies 446 and 448 being operative to alternately connect the pump or the evaporator to the fluid circuit containing the hydrodynamic brake.

The pump assembly, indicated generally at 449, which may be driven electrically or by an auxiliary gasoline motor is of relatively high capacity to provide a short retrieve cycle and to provide the necessary degree of pretension on the aircraft engaging tape. For example, in a relatively small installation the pump must be capable of producing a flow of 1300 gallons per minute at 25 p.s.i. whereas in a larger installation it will deliver 1900 gallons per minute at 55 p.s.i. The delivery side of the pump is connected by a conduit 696 to one side of the valve assembly 448, the opposite side of which is connected by an elbow 698 to an opening in wall member 464 which leads into an annular chamber 700 which is in turn connected to the working chamber 477 in which the vanes operate, through an annular set of fixed vanes 702. The water is returned to the pump through a T-fitting connected to the conduit 620 which also serves as the return line from the evaporator 444.

The pump shut-off valve assembly 448, shown in detail in FIGURE 20, is for the purpose of preventing short circuiting of the evaporator assembly by reverse flow through the pump when the pump is not operating or when the working pressure in the hydrodynamic brake is higher than the pump pressure.

The valve assembly comprises an essentially cylindrical housing 706 to which end plates 708 and 710 are secured by bolts 712 and 714, respectively. An annular valve sleeve member 716 is mounted for axial sliding movement on the interior of the housing 706 and on cylindrical supports 718 and 720 projecting inwardly from the respective end plates 708 and 710. The sleeve 716 is urged to the right into seating engagement with a poppet 722 by springs 724 and 726. The poppet 722 is carried by a series of relatively thin radial vanes 728 which are rigid with the end cover plate 710.

The valve sleeve 716 is urged to the left by fluid pressure supplied to control chamber 730 through an opening 732.

The valve assembly 446 which is provided for the purpose of preventing the pump discharge from going through the evaporator instead of through the brake during the retrieve cycle is generally of the same construction as the valve assembly 448 except that it is held normally open and is closed by the application of control pressure. The stepped cylindrical housing 734 has an inlet opening 736 at one end connected to the brake chamber 700. A hollow, essentially cylindrical fitting 738 is connected to the opposite end of the main housing member 734 by a plurality of bolts 740, the open end of the fitting 738 being secured directly to the conduit 632 leading to the inlet opening 630 of the evaporator 444. A valve sleeve 742 is mounted for axial sliding movement in stepped internal bores in the housing 734 and on a cylindrical portion 744 of the fitting 738. The valve sleeve 742 is urged to the left to the position shown in FIGURE 19 by springs 746 and 748 and is urged to the right by application of control pressure through an opening 750 in the housing 734. When the valve sleeve 742 is moved to the right, it engages a poppet 752 connected to the cylindrical portion 744 of the fitting 738 by a plurality of radially extending fins 754.

Control pressure for operation of the valve assemblies 446 and 448 is preferably derived from a by-pass line leading from the output of the pump. Thus, whenever the retrieve pump is out of operation, the valve assembly 446 is opened and the valve assembly 448 is closed. Conversely, immediately when the pump is placed in operation, the valve assembly 446 is moved to its closed position and the valve assembly 448 is opened. Alternately, a separate source of fluid under pressure may be provided for operating the valves.

The operation of the system will now be described assuming that the apparatus has been pre-set for engagement by the aircraft with the tape stretched across the runway, the total force on the tape usually being from 2000 lbs.–4500 lbs.

Under these conditions, the clutch planets 562 will be displaced in a counterclockwise direction from the cam peaks 592 as viewed in FIGURE 17. The planets will be held in firm engagement with the steep cam rise section 594 because of the applied torque on the shaft 528 which acts in a clockwise direction as viewed in FIGURE 17. The cam peaks and the cam rises are so proportioned that the torque applied to the shaft 528 when the tape is under the desired degree of tension is not sufficient to move the planets past the cam peaks. Accordingly, the apparatus will remain at rest in this position indefinitely.

However when the tape is engaged by the aircraft, the torque applied to the shaft 528 rises substantially instantaneously to a value much higher than that required to move the planets over the cam peaks 592. Accordingly the spider 570 is shifted circumferentially in a clockwise direction as viewed in FIGURES 16 and 17, the clockwise movement continuing until the planets reach the next adjacent dwell portion 596. Overtravel of the spider is prevented by the stops 590 and the deflection of the spring sets 576 and 578. Accordingly, the planets reach an equilibrium position where they begin to slip between the sun member 552 and the outer ring 554 and continue to urge the spider in a clockwise direction with a torque which is just matched by the relatively light springs 576 and 578. Under these conditions the shaft 528 is capable of substantially free rotation. This position of the parts is maintained until the aircraft completes its runout at which time the drum and the input shaft 528 come to rest.

As the tape unwinds, the rotor vanes 466 of the hydrodynamic brake are rapidly rotated, the brake reaching a peak rotary speed when the aircraft has travelled a distance from the engagement point approximately equal to 1½ times the span between the braking units. The brake torque increases gradually during the spin-up phase since it is proportional to the rotary speed of the unit at a given throttle setting. The brake illustrated in FIGURE 15 develops the retarding torque in the manner described above with the embodiment of FIGURES 1–12.

Since the retarding force exerted on the tape is proportional to the square of the speed of the aircraft and all aircraft of the same weight are retarded with the deceleration which is also proportional to the square of the aircraft speed, all aircraft of the same weight will stop in the same distance irrespective of their engagement speeds.

Thus any aircraft within a certain weight range engaging the arrester at any speed will stop between predetermined run-out limits once the brake throttle is correctly set. Conesquently the throttle indicator scale 500 is calibrated in aircraft weight. A different calibration table is required for each combination of span and run-out.

As the tape runs out, a portion of the water in the working chamber 477 is bled through the vanes 702 and is delivered to the inlet of the evaporator, the valve assembly 446 being automatically positioned to permit such flow.

Water is forced in through the inlet passage into the chamber 642 and thence past the tangential vanes 646 from which it emerges in a rapidly whirling vortex flow pattern. The water then passes through the slot 648 and forms a thin rapidly revolving curtain 760 which moves axially of the apparatus toward the base plate. The evaporation chamber is drained by the curtain which acts as an ejection pump and surplus water is pushed back into the storage tank so that its level reaches approximately the top of the sight gauge as shown by reference line 691 when the system has been properly filled. At the exit of the slot 648, the pressure drops instantly throughout the entire flow of water and in the curtain part of it flashes into steam. Accordingly, the temperature of the remaining water drops to that corresponding to the pressure in the evaporation space. Since this space communicates freely with the atmosphere through the freely openable top cover member 672, the pressure within the evaporation space is only slightly above atmospheric. Thus the temperature of the water after it has passed through the evaporation space is only slightly above 212° F. The rotation of the curtain sets up a centrifugal field which materially aids in separating the steam from the water, the steam being lighter and passing to the inner surface of the curtain and proceeding in the direction of arrows 762 upwardly around the central tube 658. Because of this feature, very large quantities of steam can be released in the small space provided.

At the lower end of the curtain, the water re-forms into a "solid" ring as shown at 764. The angular momentum of the curtain is retained in this ring which therefore revolves and generates static pressure. The water in the ring then passes outwardly through the diffuser vanes 612 into the annular water collection chamber 616 for return to the brake through the conduit 620. As the water passes through the diffuser vanes, additional pressure is recovered and the water is returned to the hydrodynamic brake apparatus at a pressure high enough to prevent vaporization even after it reaches an elevated temperature which may be 285° F.

The evaporated water is replenished by flow of water from the storage tank 652 downwardly through the conduits 656 and 658 toward the water ring 764. The water is supplied to the region adjacent the outer rim of the adapter plate 660 with a slight pressure head. Since the water ring pressure must equalize the delivery head at delivery radius, the inner surface of the water ring moves radially in or out to maintain balance. As water is consumed, the ring surface moves radially out. This reduces the static pressure at replenishing radius and allows water to flow from the storage tank into the water ring until balance is restored. In a typical case the consumption of water is eight gallons per million foot lbs. for each of the brake units.

The tape continues to run out until the aircraft has substantially come to rest. Since the shaft of the hydrodynamic brake stops when the tape stops and since the retarding torque exerted by the brake is zero when the mechanism is at rest, there would be insufficient force exerted by the brake near the end of the run out to finally stop the aircraft. However, the nylon tape acts as an energy storage device. It is initially stretched and then contracts as the aircraft speed decreases and the force on the tape decreases. Thus toward the end of the runout the end of the tape attached to the reel moves at a higher speed than the portion of the tape attached to the aircraft. The tension remaining in the tape when the aircraft stops keeps the brake end of the tape moving thus permitting the brake to develop a retarding torque. In some cases where particularly high initial loads are produced, the contraction of the tape will have a tendency to pull the aircraft backward slightly after it has come to rest.

To prepare the system for new engagement, the tape is disconnected from the aircraft and the retrieve control is actuated. This control system can take a number of conventional forms. Basically, it will either consist of a simple control for starting the retrieve pump, or, if the pump is left running constantly, it will comprise a simple manually or electrically operated valve for connecting pressure from the output of the pump to the control chambers of the valve assemblies 446 and 448. The retrieve circuit can be energized by simply closing the switches for the required period of time or a conventional timing device can be used to de-energize the system at the end of the retrieve cycle.

During the retrieve cycle the valve assembly 446 is closed and the valve assembly 448 is opened thus preventing flow of water through the evaporator and providing for a flow of water under pressure to the working chamber of the hydrodynamic brake which then functions as a turbine to rotate the tape reel and the clutch shaft in a retrieve or counterclockwise direction as viewed in FIGURES 16 and 17. Since the springs 576 and 578 urge the planets into engagement with the sun ring 552 and the shallow cam rise 598, the planets and the spider are immediately shifted bodily in a counterclockwise direction as viewed in FIGURE 17 and this motion is continued until the planets pass the cam peaks 592 and come to rest in the dwells 596 at the opposite sides of the cam peaks. Overtravel in this direction is prevented by the stops 584 and the deflection of the spring 574 which holds the parts in an equilibrium position in which the shaft 528 is freely rotatable in a counterclockwise direction. This motion continues until the tape is fully wound on the reel at which time the brake stalls and is shut off. At this moment, the tension in the tapes rotates the shaft 528 in a clockwise direction which tends to pull the planets up the steep rise section 594 toward the cam peak 592. However, as stated above, the torque applied by the tape is insufficient to move the planets past the cam peaks and the mechanism again comes to rest. It is to be noted that because of the utilization of the steep and shallow cam rises the unlocking froce is many times higher than the resetting force. This avoids the imposition of undue torque loads on the motor apparatus which drives the reels in a retrieve direction. It is also to be noted that the resetting force is encountered before the tape is tensioned and when the coil radius is still small. Thus tape torque load on the retrieve motor is relatively light.

It is a feature of the hydrodynamic brake that when it is operated as a turbine or motor, its static torque is several times its torque at operating speed. Thus when the tape becomes taut across the runway and the shaft of the hydrodynamic brake stops while the pump is still feeding water into the brake, a relatively high force is exerted which automatically pretensions the tape, without the necessity of supplying the operating fluid at excessively high pressure.

Since the retarding mechanism does not require a cooling period between cycles, it may be operated with a frequency which is determined by the run-out time, the disengagement time and the retrieve time.

Since run-out time is usually in the neighborhood of 5 seconds, the tape can be disconnected in 10 seconds and can be retrieved in 15 seconds, the total cycle time may be about 30 seconds. The system can be operated on this cycle indefinitely.

This application is a continuation-in-part of application Serial No. 829,071 filed July 23, 1959 for Power Absorbing Systems and Components, now abandoned.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. An aircraft retarding system having a flexible strand engageable by the aircraft, comprising reel structures upon which the opposite ends of said strand are normally coiled, a rotary variable capacity hydraulic drag device rotatable with said reel srtucture to control the rate at which the strand is fed from the reel structure when the strand is engaged by an aircraft, a throttle assembly in said drag device for regulating the capacity of said drag device; and control means driven by said strand and responsive to the deceleration of said aircraft to position said throttle assembly to thereby control the capacity of said drag device to decelerate said aircraft at a predetermined rate to thereby bring the aircraft to a stop at a predetermined roll-out distance.

2. An aircraft retarding system having a flexible strand engageable by an aircraft, comprising reel structures upon which the opposite ends of said strand are normally coiled, a rotary drag device, a relatively fixed stator vane assembly in said device, a rotor vane assembly in said device rotatable with said reel structure, said stator vane assembly and said rotor vane assembly being positioned in a fluid-filled chamber and cooperating to move said fluid in a predetermined path in said chamber, a throttle assembly adjustably positioned in said chamber for selectively opening and restricting said path to thereby vary the drag exerted by said device, said rotor and stator assemblies cooperating to raise the temperature of the fluid in said chamber, and means for dissipating the heat imparted to said fluid to the atmosphere externally of said device.

3. An aircraft retarding system having a flexible strand engageable by an aircraft, comprising reel structures upon which the opposite ends of said strand are normally coiled, a variable capacity drag device rotatable with said reel structures to control the rate at which the strand is fed from said reel structures when engaged by an aircraft, said hydraulic drag device having an annular working chamber containing water, a plurality of rotor vanes and stator vanes in said chamber cooperating to convert the kinetic energy of said rotor vanes to heat energy which is absorbed by said water, means defining an evaporation chamber in communication with the atmosphere through an outlet through which water evaporated in said chamber may pass, means defining passages for bleeding a portion of the heated water from the outer periphery of said working chamber to said evaporation chamber, the evaporation of said water absorbing the heat energy imparted to said water in said working chamber, and means defining passages for returning the remainder of said portion of water to said working chamber adjacent the inner periphery thereof.

4. An aircraft retarding system having a flexible strand engageable by the aircraft, comprising reel structures upon which the opposite ends of said strand are normally coiled, a variable capacity hydraulic drag device rotatable with said reel structures to control the rate at which the strand is fed from the reel structure when the strand is engaged by an aircraft, said hydraulic drag device having a chamber containing water, a plurality of rotor vanes and stator vanes in said chamber cooperating to convert the kinetic energy of said rotor vanes to heat energy absorbed by said water, means defining an evaporation chamber in communication with the atmosphere having an outlet through which water evaporated in said chamber may pass, means for bleeding a portion of the heated water from said working chamber to said evaporator chamber to evaporate a portion of said water to thereby absorb the heat energy created in said working chamber, and a control device driven by said strand to control the rate of flow of water in said working chamber to thereby control the capacity of said hydraulic drag device to bring the aircraft to a stop in a predetermined roll-out distance.

5. An aircraft retarding system having a flexible strand engageable by the aircraft comprising reel structures upon which the opposite ends of said strand are normally coiled, a variable capacity hydraulic drag device rotatable with said reel structures to control the rate at which the strand is fed from the reel structure when the strand is engaged by an aircraft, said hydraulic drag device having a working chamber containing water, a plurality of rotor vanes and stator vanes in said chamber cooperating to convert the kinetic energy of said rotor vanes to heat energy absorbed by said water, means defining an evaporation chamber having an outlet to atmosphere through which water evaporated in said evaporation chamber may pass, means defining passages for bleeding a portion of the heated water from the outer periphery of said working chamber to said evaporation chamber, means defining passages for connecting said evaporation chamber to the inner periphery of said working chamber to return the unevaporated water to said working chamber, and an annular throttle ring in said device adapted to extend into said working chamber to control the rate of flow of water between said stator vanes and said rotor vanes to thereby control the drag exerted by said device to bring the aircraft to a stop in a predetermined roll-out distance.

6. The system according to claim 5 together with means accessible externally of said device for positioning said throttle.

7. An aircraft retarding system having a flexible strand engageable by the aircraft comprising reel structures upon which the opposite ends of the strand are normally coiled, a variable capacity drag device rotatable with said reel structures to control the rate at which the strand is fed from the reel structure when the strand is engaged by an aircraft, an internal control member for regulating the drag exerted by said device, an inertia member driven with said strand during acceleration of said strand, a spring, means for tensioning said spring during acceleration of said strand to a value proportional to the square of the velocity of the aircraft, a control unit for positioning said control member and operable when displaced in either direction from a neutral position for moving said control member, and means for operably connecting said spring and said inertia member to said last-mentioned means to exert oppositely directed forces thereon.

8. An aircraft retarding system having a flexible strand engageable by the aircraft comprising reel structure upon which the end of the strand is normally coiled, a variable capacity rotary drag device rotatable with said reel structure to control the rate at which said strand is fed from the reel structure when the strand is engaged by an aircraft, said drag device having a working chamber containing water, a plurality of rotor vanes and stator vanes in said chamber cooperating to convert the kinetic energy of said rotor vanes to heat energy absorbed by said water, means defining an evaporation chamber having a first outlet through which water evaporated in said evaporation chamber may pass, means defining passages for delivering a portion of the heated water from a high pressure region in said working chamber to the inlet of said evaporation chamber, and means defining passages for connecting a second outlet of said evaporation chamber to a low pressure region of said working chamber to return the unevaporated water to said working chamber at reduced temperature.

9. Apparatus for decelerating an object moving in an essentially straight path comprising reel structures rotatably mounted at fixed locations with respect to said path, a flexible strand having a central portion engageable by said object and having its opposite ends wound on said reel structures, a pair of variable drag devices, a fixed stator vane assembly in each of said devices, a rotor vane assembly in each of said devices, one of said rotor vane assemblies being rotatable with one of said reel structures and the other of said rotor vane assemblies being rotatable with the other reel structure, said stator vane assemblies and the associated rotor vane assemblies being positioned in a water filled chamber and cooperating to convert the kinetic energy of said rotor vanes to heat energy which is absorbed by said water, means defining an evaporation chamber, means defining passages for bleeding a portion of the heated water from the working chamber of each of said devices to said evaporation chamber, the evaporation of said water absorbing the heat energy imparted to said water in said working chamber, and means defining passages for returning the remainder of said portion of said water to said working chamber adjacent the inner periphery thereof.

10. The structure according to claim 9 together with throttle means extending into said working chamber for controlling the drag exerted by said hydraulic drag devices.

11. An aircraft retarding system having a flexible strand engageable by the aircraft comprising reel structure upon which said strand is normally wound, a rotary variable capacity hydraulic drag device rotatable with said reel structure to control the rate at which the strand is fed from the reel structure when the strand is engaged by an aircraft, means providing a source of fluid under pressure, means for delivering said fluid under pressure to said drag device to drive said drag device in a direction to rotate said reel structure to rewind said strand thereon, and releasable clutch means operatively associated with said reel structure to hold said reel structure against movement in a strand feeding direction.

12. An aircraft retarding system having a flexible strand engageable by an aircraft comprising reel structures upon which the opposite ends of said strand are normally wound, rotary variable capacity hydraulic drag devices, a rotor vane assembly in each said device rotatable with one of said reel structures, a stator vane assembly in each of said devices, said stator vane assembly and said rotor vane assembly being positioned in a fluid filled chamber and cooperating to move said fluid in a predetermined path in said chamber, means providing a source of fluid under pressure, and means for delivering said fluid under pressure to said chambers for movement therein through said path in a reverse direction to drive said drag devices to rotate said reel structures in a direction to rewind said strand on said reel structures after said strand has been disconnected from said aircraft.

13. An aircraft retarding system having a flexible strand engageable by an aircraft, comprising reel structures upon which the opposite ends of said strand are normally wound, a pair of hydraulic drag devices associated respectively with said reel structures, each of said drag devices comprising a relatively fixed annular stator vane assembly, an annular rotor vane assembly rotatable with a respective reel structure coaxially of said stator vane assembly, said stator vane assembly and said rotor vane assembly being positioned in a chamber containing a fluid, fixed ring structure separating said rotor vane assembly and said stator vane assembly, said vane assemblies cooperating to move said fluid in a predetermined path in said chamber, a portion of said fluid being moved by said rotor vane assembly around said ring structure for interception by said stator vane assembly and return to said rotor vane assembly, means for controlling the volumetric rate at which fluid circulates around said ring to thereby vary the drag exerted by said device, said rotor and stator vane assemblies cooperating to raise the temperature of the fluid in said chamber, a heat dissipating assembly positioned externally of said drag device and means for conducting a portion of said fluid from said chamber to said heat dissipating assembly for dissipating the heat imparted to said fluid.

References Cited in the file of this patent

UNITED STATES PATENTS

| | | |
|---|---|---|
| 1,854,952 | Nilson | Apr. 19, 1932 |
| 2,401,291 | Smith | May 28, 1946 |
| 2,448,782 | Davis | Sept. 7, 1948 |
| 2,543,929 | Olman | Mar. 6, 1951 |
| 2,731,219 | Cotton et al. | Jan. 17, 1956 |
| 2,987,278 | Hoffman et al. | June 6, 1961 |